US012733067B2

(12) United States Patent
Yang

(10) Patent No.: US 12,733,067 B2
(45) Date of Patent: Sep. 8, 2026

(54) SIDELINK COMMUNICATION METHOD AND DEVICE

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 338 days.

(21) Appl. No.: 18/577,721

(22) PCT Filed: Jul. 9, 2021

(86) PCT No.: PCT/CN2021/105586

§ 371 (c)(1),
(2) Date: Jan. 9, 2024

(87) PCT Pub. No.: WO2023/279394

PCT Pub. Date: Jan. 12, 2023

(65) Prior Publication Data

US 2024/0324061 A1 Sep. 26, 2024

(51) Int. Cl.

*H04W 76/28* (2018.01)
*H04W 24/02* (2009.01)
*H04W 48/10* (2009.01)
*H04W 52/02* (2009.01)
*H04W 72/02* (2009.01)
*H04W 72/20* (2023.01)

(Continued)

(52) U.S. Cl.

CPC ........... *H04W 76/28* (2018.02); *H04W 24/02* (2013.01); *H04W 48/10* (2013.01); *H04W 52/02* (2013.01); *H04W 72/02* (2013.01); *H04W 72/20* (2023.01); *H04W 72/25* (2023.01); *H04W 72/51* (2023.01); *H04W 76/14* (2018.02)

(58) Field of Classification Search

CPC ..... H04W 24/02; H04W 48/10; H04W 52/02; H04W 72/02; H04W 72/20; H04W 72/25; H04W 72/51; H04W 76/14; H04W 76/28

See application file for complete search history.

(56) References Cited

U.S. PATENT DOCUMENTS

2021/0195522 A1 6/2021 Sridharan et al.
2022/0346180 A1 * 10/2022 Tseng .................... H04W 76/14

(Continued)

FOREIGN PATENT DOCUMENTS

CN 112512102 A 3/2021
JP 2021-107507 * 6/2021 ............ H04W 92/18

(Continued)

OTHER PUBLICATIONS

Extended European Search Report Issued in Application No. 21948888.9 dated Jul. 9, 2024, 11 pages.
"Discussion on SL DRX configuration", ZTE Corporation, Sanechips, 3GPP TSG RAN WG2 Meeting #114 electronic, R2-2105077, Online, May 19-27, 2021, 7 pages.

(Continued)

*Primary Examiner* — Kevin C. Harper
(74) *Attorney, Agent, or Firm* — Finnegan, Henderson, Farabow, Garrett & Dunner, L.L.P.

(57) ABSTRACT

A sidelink communication method is performed by a first terminal, and includes: determining that the first terminal performs sidelink communication with a destination address based on a sidelink, and determining whether to not apply a limitation of sidelink discontinuous reception (DRX).

20 Claims, 4 Drawing Sheets

(51) Int. Cl.

| | |
|---|---|
| ***H04W 72/25*** | (2023.01) |
| ***H04W 72/51*** | (2023.01) |
| ***H04W 76/14*** | (2018.01) |

(56) References Cited

U.S. PATENT DOCUMENTS

| | | | | |
|---|---|---|---|---|
| 2023/0209648 | A1* | 6/2023 | Park | H04W 72/02<br>370/329 |
| 2023/0239957 | A1* | 7/2023 | Fujishiro | H04W 52/0229 |
| 2024/0251476 | A1* | 7/2024 | Hong | H04W 72/25 |
| 2024/0298379 | A1* | 9/2024 | Hayashi | H04W 76/28 |

FOREIGN PATENT DOCUMENTS

| | | | | |
|---|---|---|---|---|
| WO | 2021093203 | A1 | 5/2021 | |
| WO | WO 2021088650 | A1 | 5/2021 | |
| WO | WO 2021119474 | A1 | 6/2021 | |
| WO | 2021127866 | A1 | 7/2021 | |
| WO | WO-2022160106 | A1 * | 8/2022 | H04W 76/00 |

OTHER PUBLICATIONS

Nokia, Nokia Shanghai Bell, "Backward Compatibility Issue of SL DRX with Rel. 16 Sidelink", 3GPP TSG-RAN WG2 Meeting #113 Electronic, R2-2101323, Elbonia, Jan. 25-Feb. 5, 2021, 3 pages.

Notice of Reasons for Refusal for Japanese Patent Application No. 2024-500612, dated Nov. 19, 2024, 12 pages.

The First Office Action for Chinese Application No. 202180002123.7, dated Mar. 20, 2024.

International Search Report and Written Opinion of International Application No. PCT/CN2021/105586, dated Feb. 22, 2022, 12 pages.

* cited by examiner

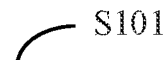

in response to determining that the first terminal performs sidelink communication with a destination address based on a sidelink, determining whether to not apply a limitation of sidelink discontinuous reception (DRX)

FIG. 1

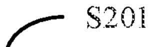

in response to determining that the first terminal performs sidelink communication with a destination address based on a sidelink, determining whether a second terminal that is unable to use the sidelink DRX and that performs sidelink communication with the destination address exists

S202

If exists, determining to not apply the limitation of the sidelink DRX

FIG. 2

in response to determining that the first terminal performs sidelink communication with a destination address based on a sidelink, determining a communication standard supported by the second terminal

in response to determining that at least one second terminal does not support a communication protocol of a designated version, determining that the second terminal that is unable to use the sidelink DRX and that performs sidelink communication with the destination address exists

If exists, determining to not apply the limitation of the sidelink DRX

FIG. 3

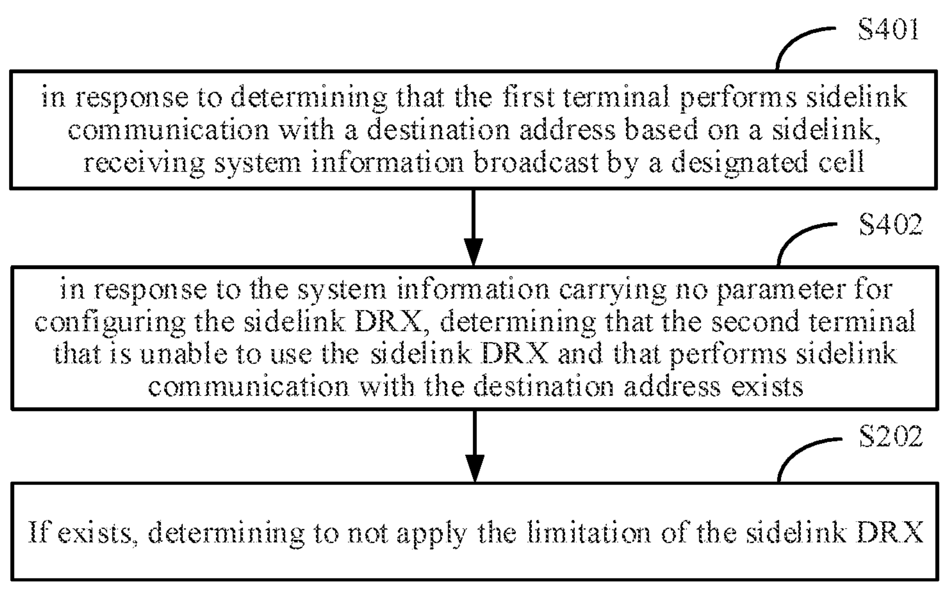

FIG. 4

S501 in response to determining that the first terminal performs sidelink communication with a destination address based on a sidelink, receiving system information broadcast by a designated cell

S502 in response to the system information indicating that the designated cell is unable to use the sidelink DRX, determining that the second terminal that is unable to use the sidelink DRX exists

S202

If exists, determining to not apply the limitation of the sidelink DRX

FIG. 5

SIDELINK COMMUNICATION METHOD AND DEVICE

CROSS REFERENCE TO RELATED APPLICATIONS

This application is a U.S. national phase of International Application No. PCT/CN2021/105586, filed on Jul. 9, 2021, the entire contents of which are incorporated herein by reference.

TECHNICAL FIELD

This present disclosure relates to the field of communication technology, particular to a sidelink communication method and apparatus, a communication device, and a computer-readable storage medium.

BACKGROUND

Sidelink is an end-to-end (D2D) communication technology, which means direct communication between terminals. This technology mainly includes two functions. One is a D2D discovery function, which enables user devices to discover each other in the near-field through a radio frequency (RF) air interface, and the other one is a D2D communication function, which enables the user devices to directly perform data transmission with each other through the RF air interface without routing through a network, and the network is only responsible for resource coordination and security control.

The sidelink-based direct communication supports three transmission methods, namely unicast, multicast, and broadcast.

SUMMARY

According to a first aspect of the embodiments of the disclosure, a sidelink communication method is performed by a first terminal, and includes: determining that the first terminal performs sidelink communication with a destination address based on a sidelink, and determining whether to not apply a limitation of sidelink discontinuous reception (DRX).

According to a second aspect of the embodiments of the disclosure, a first terminal includes:

- a processor;
- a memory for storing instructions executable the processor.

The processor is configured to perform the above sidelink communication method according to the first aspect.

According to a third aspect of the embodiments of the disclosure, a computer-readable storage medium has stored thereon a computer program that, when executed by a processor of a first terminal, causes the first terminal to perform the above sidelink communication method according to the first aspect is performed.

BRIEF DESCRIPTION OF THE DRAWINGS

A brief introduction is made below to the accompanying drawings of the present disclosure. It is obvious that the accompanying drawings below are only example embodiments of the disclosure. For those skilled in the art, other embodiments may be obtained.

FIG. 1 is a flowchart of a sidelink communication method according to an embodiment of the disclosure.

FIG. 2 is a flowchart of a sidelink communication method according to another embodiment of the disclosure.

FIG. 3 is a flowchart of a sidelink communication method according to another embodiment of the disclosure.

FIG. 4 is a flowchart of a sidelink communication method according to another embodiment of the disclosure.

FIG. 5 is a flowchart of a sidelink communication method according to another embodiment of the disclosure.

DETAILED DESCRIPTION

Figure 6:
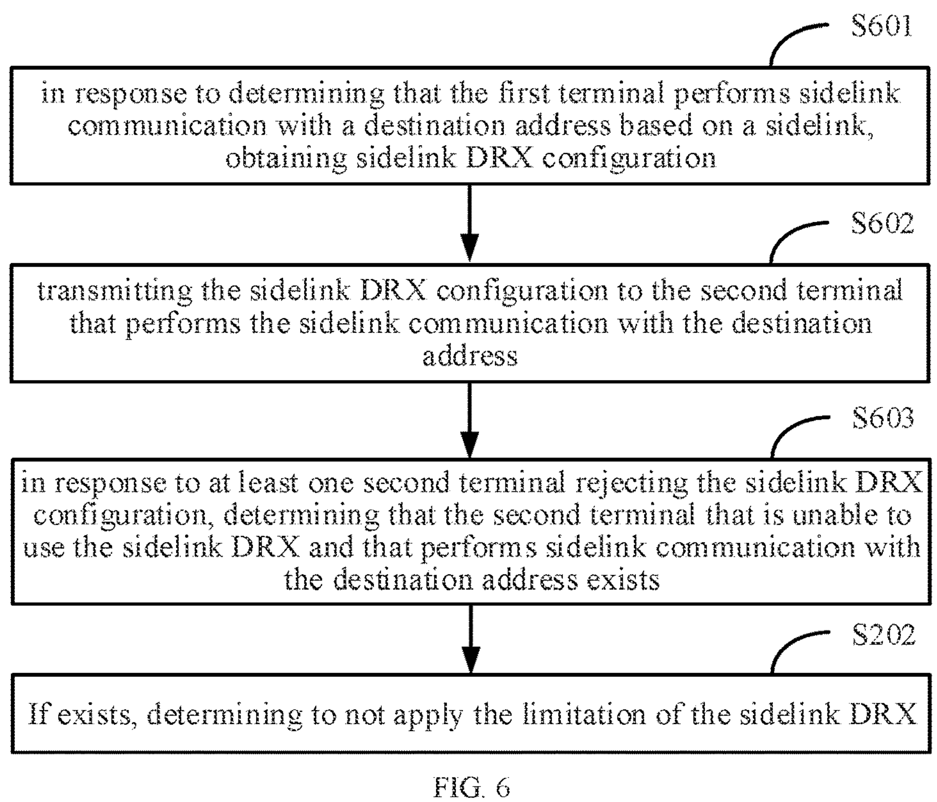
FIG. 6 is a flowchart of a sidelink communication method according to another embodiment of the disclosure.

A clear and complete description of technical solutions in the embodiments of the disclosure may be made with reference to the accompanying drawings below. Obviously, the described embodiments are only a part of rather than all of the embodiments of the disclosure. Based on the embodiments of the disclosure, all other embodiments obtained by those skilled in the art without creative labor fall within the scope of protection of the disclosure.

The terms used in the embodiments of the disclosure are only for the purpose of describing specific embodiments, and are not intended to limit the embodiments of the disclosure. The singular forms of “a” and “the” used in the embodiments of the disclosure and appended claims are also intended to include plural forms, unless the context clearly indicates other meanings. It should also be understood that the term “and/or” as used herein refers to and includes any or all possible combinations of one or more associated listed items.

It should be understood that although the terms “first”, “second”, and “third” may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term “if” as used herein can be interpreted as “when”, “while” or “in response to determining”.

For the purpose of conciseness and ease of understanding, the terms used to represent size relationships in this description are “greater than” or “less than”, “higher than” or “lower than”. However, for those skilled in the art, it can be understood that the term “greater than” also encompasses the meaning of “greater than or equal to”, and “less than” also encompasses the meaning of “less than or equal to”: the term “higher than” encompasses the meaning of “higher than or equal to”, and “lower than” also encompasses the meaning of “lower than or equal to”.

In order to save device power consumption of a terminal during sidelink communication, sidelink discontinuous reception (DRX) is introduced. For the broadcast and groupcast, sidelink DRX configuration of a receiving terminal is determined based on a type of a service. For the unicast, the sidelink DRX configuration of the receiving terminal is configured by a transmitting terminal or a base station of the transmitting terminal.

However, the usage of the sidelink DRX varies among different terminals, and there are some problems when sidelink communication is performed between terminals based on the sidelink DRX.

FIG. 1 is a flowchart of a sidelink communication method according to an embodiment of the disclosure. The sidelink communication method shown in this embodiment may be performed by a first terminal. The first terminal includes but is not limited to communication devices such as mobile phones, tablets, wearable devices, sensors, and Internet of Things (IoT) devices. The first terminal can serve as a user device to communicate with a base station. The base station includes but is not limited to base stations in a communication system such as a 4G base station, a 5G base station, a 6G base station, etc. As shown in FIG. 1, the sidelink communication method may include the following steps.

Step S101, it is determined whether to not apply a limitation of sidelink discontinuous reception (DRX) in response to determining that the first terminal performs sidelink communication with a destination address based on a sidelink.

In an embodiment, the first terminal may perform sidelink communication with the destination address based on sidelink. For example, when performing unicast communication, the destination address is an address of a peer device. When performing groupcast communication, the destination address is an address of a groupcast group. When performing broadcast communication, the destination address is a broadcast address.

In an embodiment, the first terminal may be a data transmitting end, and the first terminal may transmit data to the destination address. A data receiving end may be referred to as a second terminal. The second terminal may receive data transmitted to the destination address. Taking the groupcast communication as an example, the first terminal can transmit data to a groupcast group address, and the second terminal can receive the data transmitted to the groupcast group address.

In an embodiment, the first terminal may be a data receiving end, and the first terminal may receive data transmitted to the destination address. A data transmitting end and other data receiving ends can be referred to as the second terminals. The second terminal, as a data transmitting end can send the data to the destination address. The second terminal, as the data receiving end, similar to the first terminal, can receive data transmitted to the destination address. It should be noted that, if the communication with the destination address is the unicast communication, the second terminal only includes the data transmitting end. If the communication with the destination address is the groupcast or broadcast communication, the second terminal includes the data transmitting end, and may also include several other data receiving ends.

In an embodiment, if the first terminal is a terminal that supports a sidelink DRX function, the terminal determines whether to not apply the limitation of the sidelink DRX after determining the need for performing sidelink-based communication with the destination address determining and before performing the communication, such as transmitting or receiving data.

It should be noted that, based on the sidelink DRX function, the terminal may switch to a sleep state or a wake-up state. For the receiving end, during the wake-up state (also known as an activation duration), it monitors a sidelink channel to receive data, while does not monitor the sidelink channel during the sleep state, thus achieving an energy-saving effect. For the transmitting end, it is determined whether to transmit the data based on a DRX state of the receiving end. When the receiving end is in a wake-up state, the transmitting end transmits the data, and when the receiving end is in a sleep state, the transmitting end does not transmit data.

In an embodiment, that the first terminal does not apply the limitation of the sidelink DRX and may refer to performing corresponding operations without considering whether it is in a wake-up state. For example, if the first terminal serves as the data receiving end, not applying the limitation of the sidelink DRX may refer to monitoring communication transmitted to the destination address at all sidelink receiving resource locations. Or, if the first terminal serves as the data transmitting end, not applying the limitation of the sidelink DRX may refer to determining that all sidelink transmitting resources are able to be used to transmit data to the destination address.

In an embodiment, if the first terminal determines apply the limitation of the sidelink DRX, scheduling is still performed based on the sidelink DRX. That is, data reception and transmission are only performed within the activation duration of the receiving end, thereby saving terminal's power consumption.

According to the embodiment shown in FIG. 1, the terminal does not always use the sidelink DRX for sidelink communication, but determines whether to not apply the limitation of the sidelink DRX based on an actual situation. On the one hand, it can avoid unnecessary data latency caused by the sidelink DRX, on the other hand, it can also avoid data loss caused by mismatched use of the sidelink DRX between the transmitting end and the receiving end.

There may various methods for the terminal to determine whether to not apply the sidelink DRX, which will be introduced with reference to specific embodiments.

FIG. 2 is a flowchart of a sidelink communication method according to an embodiment of the disclosure. As shown in FIG. 2, determining whether to not apply the limitation of the sidelink DRX includes the following steps.

Step S201, it is determined whether a second terminal that is unable to use the sidelink DRX and that performs sidelink communication with the destination address exists.

In an embodiment, the second terminal performing sidelink communication with the destination address varies depending on a type of the communication. For example, for the unicast communication, the second terminal is a peer device of the first terminal. For the groupcast communication, the second terminal is a terminal in a groupcast group other than the first terminal. For the broadcast communication, the second terminal is a terminal other than the first terminal in a broadcast domain.

Descriptions are made below for the first terminal being the data transmitting end and the data receiving end, respectively.

In an embodiment, the first terminal may be the data transmitting end, and communication between the first terminal and the destination address includes: the first terminal transmitting data to the destination address. The second terminal performing sidelink communication with the destination address is the data receiving end. That is, the second terminal receives the data transmitted to the destination address.

For the unicast communication, the second terminal that performs sidelink communication with the destination address is a terminal indicated by the destination address.

Based on this, the first terminal can determine whether the terminal indicated by the destination address is able to use the sidelink DRX. If yes, it is determined that no second terminal that is unable to use the sidelink DRX and that performs sidelink communication with the destination address exists. If not, it is determined that the second terminal that is unable to use the sidelink DRX and that performs sidelink communication with the destination address exists.

For the groupcast and broadcast communication, the second terminal that performs sidelink communication with the destination address is a terminal that receives data from the destination address, such as other terminals in the groupcast group or other terminals in the broadcast domain. Based on this, the first terminal can determine whether there is at least one second terminal that is unable to use the sidelink DRX in the groupcast group or the broadcast domain. If all terminals in the groupcast group or the broadcast domain is able to use the sidelink DRX, it is determined that no second terminal that is unable to use the sidelink DRX and that performs sidelink communication with the destination address exists. If there is at least one second terminal that is unable to use the sidelink DRX in the groupcast group or broadcast domain, it is determined that the second terminal that is unable to use the sidelink DRX and that performs sidelink communication with the destination address exists.

In an embodiment, the first terminal may be the data receiving end, and communication between the first terminal and the destination address includes: the first terminal receiving data transmitted to the destination address. The second terminal performing sidelink communication with the destination address includes a data transmitting end, or may include other data receiving ends (i.e., terminals other than the first terminal that receive data from the destination address).

For the unicast communication, the second terminal that performs the sidelink communication with the destination address is the data transmitting end (i.e. a terminal that transmits data to the destination address). Based on this, the first terminal can determine whether the data transmitting end of the unicast communication is able to use the sidelink DRX. If yes, it is determined that no second terminal that is unable to use the sidelink DRX and that performs the sidelink communication with the destination address exists. If not, it is determined that the second terminal that is unable to use the sidelink DRX and that performs sidelink communication with the destination address exists.

For the groupcast and broadcast communication, the second terminal that performs the sidelink communication with the destination address includes: a data transmitting terminal (i.e. a terminal that transmits data to the destination address), and at least one other data receiving terminal (i.e., other terminals that receive data from the destination address other than the first terminal), i.e., other terminals in the groupcast group or other terminals in the broadcast domain. Based on this, the first terminal can determine whether there is at least one second terminal that is unable to use the sidelink DRX in the groupcast group or broadcast domain. If all terminals in the groupcast group or broadcast domain is able to use the sidelink DRX, it is determined that no second terminal that is unable to use the sidelink DRX and that performs sidelink communication with the destination address exists. If there is at least one second terminal in the groupcast group or the broadcast domain that is unable to use the sidelink DRX, it is determined that the second terminal that is unable to use sidelink DRX and that performs sidelink communication with the destination address exists.

In an embodiment, the first terminal may determine whether there is a second terminal that is unable to use the sidelink DRX in at least one second terminal that performs sidelink communication with the destination address.

It should be noted that whether a terminal being able to use the sidelink DRX includes at least two situations. One is that a version of the communication standard supported by the terminal does not support the sidelink DRX function. The other one is that the terminal determines to not enable the sidelink DRX function during current sidelink communication based on an instruction of a base station or a type of a service.

Step S202, in response to determining that the second terminal that is unable to use the sidelink DRX and that performs sidelink communication with the destination address exists, it is determined to not apply the limitation of the sidelink DRX.

In an embodiment, if the first terminal determines that the second terminal that is unable to use the sidelink DRX and that performs sidelink communication with the destination address exists, it is determined to not apply the limitation of the sidelink DRX.

If the first terminal performs unicast communication and the destination address is an address of a peer device (i.e. the second terminal), and if the first terminal determines that the second terminal is unable to use the sidelink DRX, the limitation of the sidelink DRX is not applied.

If the first terminal performs groupcast communication and the destination address is a groupcast group address, and if the first terminal determines that there is a second terminal that is unable to use the sidelink DRX in the groupcast group, the limitation of the sidelink DRX is not applied.

If the first terminal performs broadcast communication and the destination address is a broadcast address, and if the first terminal determines that there is a second terminal that is unable to use the sidelink DRX in the broadcast domain, the limitation of the sidelink DRX is not applied.

It should be noted that, if the first terminal is a transmitting end and there is a second terminal that is unable to use the sidelink DRX in the receiving ends, the first terminal does not apply the limitation of the sidelink DRX so as to improve the timeliness of data transmission and avoid unnecessary latency. For example, it can be determined that all sidelink transmission resources can be used to transmit data.

If the first terminal is a receiving end and there is a second terminal that is unable to use the sidelink DRX in other receiving ends, the transmitting end does not apply the limitation of the sidelink DRX when transmitting data. That is, it is not limited to transmitting data within the activation duration. Based on this, if the first terminal only receives data within the activation duration, data loss may be caused. Therefore, in order to ensure the reliability of receiving data, the first terminal does not apply the limitation of the sidelink DRX. For example, it may monitor communication transmitted to the destination address at all sidelink receiving resource locations.

In an embodiment, if it is determined that no second terminal that is unable to use the sidelink DRX and that performs sidelink communication with the destination address exists, the limitation of the sidelink DRX is applied, and sidelink communication is still performed based on the sidelink DRX.

FIG. 3 is a flowchart of a sidelink communication method illustrated according to an embodiment of the disclosure. As shown in FIG. 3, determining whether the second terminal that is unable to use the sidelink DRX and that performs sidelink communication with the destination address exists includes the following steps.

Step S301, a communication standard supported by the second terminal is determined.

Step S302, in response to determining that at least one second terminal does not support a communication protocol of a designated version of, it is determined that the second terminal that is unable to use the sidelink DRX and that performs sidelink communication with the destination address exists, the designated version is a version that supports usage of the sidelink DRX.

In an embodiment, the first terminal can detect the communication standard supported by the second terminal. If it is detected that at least one second terminal does not support the communication protocol of the designated version, it is determined that the second terminal that is unable to use the sidelink DRX and that performs sidelink communication with the destination address exists.

For example, the designated version may be the Release17 (R17) version in the 5G communication standard, as well as versions after R17. For example, if the first terminal detects that a version of the communication standard supported by at least one second terminal is R16, it is determined that the second terminal does not support the communication protocol of the designated version, thereby it is determined that the second terminal that is unable to use the sidelink DRX and that performs sidelink communication with the destination address exists.

In an embodiment, if it is detected that all second terminals support the communication protocol of the designated version, it is determined that no second terminal that is unable to use the sidelink DRX and that performs sidelink communication with the destination address exists. Therefore, when performing the sidelink communication, scheduling is performed based on the sidelink DRX, that is, data reception and transmission are only performed within the activation duration of the receiving end.

FIG. 4 is a flowchart of a sidelink communication method according to an embodiment of the disclosure. As shown in FIG. 4, determining whether the second terminal that is unable to use the sidelink DRX and that performs sidelink communication with the destination address exists includes the following steps.

Step S401, system information broadcast by a designated cell is received.

Step S402, in response to the system information does not include a parameter for configuring the sidelink DRX, it is determined that the second terminal that is unable to use the sidelink DRX and that performs sidelink communication with the destination address exists.

In an embodiment, the designated cell may be a cell that matches a communication frequency of the sidelink communication.

It should be noted that, when performing the sidelink communication, both the sidelink communication between the first terminal and the destination address, and the sidelink communication between the second terminal and the destination address are performed based on the communication frequency of the sidelink communication. The communication frequency may be the same or different from a communication frequency between the first terminal and its serving cell, or the as well as the communication frequency may be the same or different from a communication frequency between the second terminal and its serving cell. The first terminal and the second terminal operate on the communication frequency of the sidelink communication, thus a base station located on the communication frequency can interact with the first terminal and the second terminal, for example, transmitting system information to the first terminal and the second terminal. For example, if the first terminal and the second terminal support the sidelink DRX, the cell that matches the communication frequency of the sidelink communication can configure sidelink DRX for the first terminal and the second terminal, i.e., by transmitting a parameter for configuring the sidelink DRX through broadcasting system information.

Based on this, in an embodiment, the terminal can receive the system information from the designated cell. If system information from at least one designated cell does not contain the parameter for configuring the sidelink DRX, and if the first terminal can determine that the first terminal is able to use the sidelink DRX, the first terminal can determine that there is at least one second terminal that is unable to use the sidelink DRX.

In an embodiment, the designated cell may be at least one of a serving cell and a neighboring cell of the first terminal.

It should be noted that, sidelink-based sidelink communication typically refers to sidelink communication between terminals with a close distance. Therefore, the first terminal may determine that several second terminals performing sidelink communication with the destination address are located in the serving cell or the neighboring cell of the first terminal. Similar to the aforementioned embodiments, if the first terminal and the second terminal support the sidelink DRX, the serving cell or the neighboring cell may configure the sidelink DRX for the first terminal and the second terminal, i.e., by transmitting them the parameter for configuring the sidelink DRX through broadcasting system information.

Based on this, in an embodiment, the first terminal may receive system information broadcasted by the serving cell and/or the neighboring cell. That is, the first terminal receives system information broadcasted by all cells to which the second terminal is able to belong. If the system information of at least one designated cell is not configured with the parameter for the sidelink DRX, and if the first terminal can determine that the first terminal is able to use the sidelink DRX, the first terminal can determine that there is at least one second terminal that is unable to use the sidelink DRX.

According to the embodiment shown in FIG. 4, by receiving the system information from the designated cell, according to whether the system information is configured with the parameter for predicting the sidelink DRX, the first terminal can predict whether the second terminal that is unable to use the sidelink DRX and performs sidelink communication with the destination address. This method is simple and efficient, and can effectively determine whether to not apply the limitation of the sidelink DRX during performing sidelink communication.

FIG. 5 is a flowchart of a sidelink communication method according to an embodiment of the disclosure. As shown in FIG. 5, determining whether the second terminal that is unable to use sidelink DRX and that performs sidelink communication with the destination address exists includes the following steps.

Step S501, system information broadcast by a designated cell is received.

Step S502, in response to the system information indicating that the designated cell does not support usage of the sidelink DRX, it is determined that the second terminal that is unable to use the sidelink DRX exists.

In an embodiment, the designated cell may be a cell that matches a communication frequency of the sidelink communication.

It should be noted that, the first terminal and the second terminal operate on the communication frequency of the sidelink communication. Therefore, a base station located on this communication frequency can indicate to the first terminal and the second terminal. For example, if the cell indicates through system information that the sidelink DRX is unable to be used, the first terminal and the second terminal are unable to use the sidelink DRX.

Based on this, in an embodiment, the terminal can receive the system information from the designated cell. If system information from at least one designated cell indicates that the cell does not support usage of the sidelink DRX, it is determined that the second terminal that is unable to use sidelink DRX exists.

In an embodiment, the designated cell may be at least one of a serving cell and a neighboring cell of the first terminal.

It should be noted that, the sidelink communication is usually used between terminals with a close distance, the first terminal may determine that several second terminals performing sidelink communication with the destination address are located in the serving cell or the neighboring cell of the first terminal. That is to say, a serving cell of the second terminal is the service cell and/or the neighboring cell of the first terminal. For example, if a cell indicates through system information that the sidelink DRX is unable to be used, then the terminals in the cell are unable to use the sidelink DRX.

Based on this, in an embodiment, the first terminal can receive the system information broadcasted by the serving cell and/or the neighboring cell, that is, the first terminal can receive system information broadcasted by all cells to which the second terminal is able to belong. If the system information of at least one designated cell indicates that the sidelink DRX is unable to be used, the first terminal may determine that at least one second terminal that is unable to use the sidelink DRX exists.

According to the embodiment shown in FIG. 5, by receiving the system information from the designated cell, based on whether the system information indicates that the sidelink DRX is unable to be used, the first terminal can predict whether the second terminal that is unable to use the sidelink DRX and performs sidelink communication with the destination address exists. This method is simple and efficient, and can effectively determine whether to not apply the limitation of the sidelink DRX during the sidelink communication.

FIG. 6 is a flowchart of a sidelink communication method according to an embodiment of the disclosure. As shown in FIG. 6, determining whether the second terminal that is unable to use the sidelink DRX and that perform sidelink communication with the destination address exists includes the following steps.

Step S601, sidelink DRX configuration is received.

Step S602, the sidelink DRX configuration is transmitted to the second terminal that performs sidelink communication with the destination address.

In an embodiment, the first terminal can obtain the sidelink DRX configuration. For example, the terminal may obtain the sidelink DRX configuration from its own saved configuration, or may request configuration from a base station.

In an embodiment, the first terminal may transmit the sidelink DRX configuration to each second terminal. For example, if the sidelink communication is groupcast communication, the sidelink DRX configuration can be transmitted to terminals other than the first terminal in a groupcast group. If the sidelink communication is broadcast communication, sidelink DRX configuration can be transmitted to terminals other than the first terminal in a broadcast domain. In an embodiment, the first terminal can transmit the sidelink DRX configurations to each second terminal via unicast.

Step S603, in response to at least one second terminal rejecting the sidelink DRX configuration, it is determined that the second terminal that is unable to use sidelink DRX and performs sidelink communication with the destination address exists.

In an embodiment, if a second terminal accepts the sidelink DRX configuration after receiving it, the second terminal can return indication information of successful configuration to the first terminal. If the configuration is rejected, indication information of rejecting the configuration can be returned to the terminal.

Based on this, in an embodiment, the first terminal may determine whether the second terminal can use the sidelink DRX based on whether the second terminal returns the indication information of rejecting the configuration. If the second terminal rejects the sidelink DRX configuration, it is determined that the second terminal is unable to use the sidelink DRX.

In an embodiment, if at least one second terminal rejects the sidelink DRX configuration, it is determined that the second terminal that is unable to use sidelink DRX and performs the sidelink communication with the destination address exists.

According to the embodiment shown in FIG. 6, the first terminal can determine whether the second terminal is able to use the sidelink DRX by transmitting the sidelink DRX configuration, based on whether the second terminal rejects the configuration. According to the method of this embodiment, the first terminal can efficiently determine whether to not apply the limitation of the sidelink DRX when performing sidelink communication.

Figure 7:
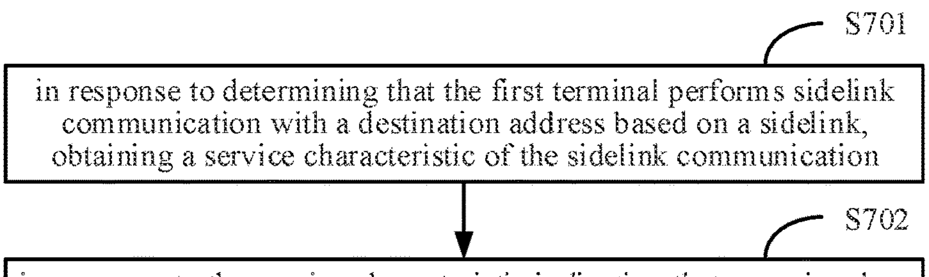
FIG. 7 is a flowchart of a sidelink communication method according to another embodiment of the disclosure.

FIG. 7 is a flowchart of a sidelink communication method according to an embodiment of the disclosure. As shown in FIG. 7, determining whether to not apply the limitation of the sidelink DRX includes the following steps.

Step S701, a service characteristics of the sidelink communication is obtained.

Step S702, in response to the service characteristic indicating that the service does not support the sidelink DRX, it is determined to not apply the limitation of the sidelink DRX.

In an embodiment, the first terminal may determine whether to support the sidelink DRX based on the service carried by the sidelink communication.

For example, the first terminal can pre-configure several types of services and indication information for indicating whether the types of services support the sidelink DRX. Optionally, this configuration may be transmitted by a base station to the first terminal. Based on this configuration, the first terminal can determine the type of service carried by the sidelink communication. If the type is does not supporting the sidelink DRX, the service characteristics indicate that the service does not support the sidelink DRX, and thus it is determined to not apply the limitation of the sidelink DRX.

Alternatively, the services can be determined based on their attributes rather than being classified. For example, multiple attributes may be pre-configured in the first terminal, as well as whether each attribute supports the sidelink DRX. If the attributes of the services carried by sidelink communication include the attribute that do not support the sidelink DRX, the service characteristic of the service indicate that the service does not support the sidelink DRX, and thus it can be determined to not apply the limitation of the sidelink DRX.

According to the embodiment shown in FIG. 7, the first terminal can determine based on the service carried by the sidelink communication. If the service characteristic of the service indicates that the sidelink DRX is not supported, the first terminal does not need to detect the second terminal communicating with the destination address, that is, it can directly determine to not apply the limitation of the sidelink DRX, thus improving processing efficiency, avoiding unnecessary data latency caused by the sidelink DRX, and also avoiding data loss caused by mismatched use of the sidelink DRX between the transmitting end and receiving end.

As described in the aforementioned embodiments, the first terminal can be either the data transmitting end or the data receiving end, which are described below.

In an embodiment, the first terminal is the data transmitting end. If the first terminal determines to not apply the limitation of the sidelink DRX, the first terminal may further transmit indication information to a base station. The indication information indicates the base station to not apply the limitation of the sidelink DRX for data transmission to the destination address.

For example, if the first terminal is in an RRC connection state, the sidelink communication of the first terminal is controlled by the serving cell. After determining to not apply the limitation of the sidelink DRX, the first terminal can report to the base station, which may include reporting the destination address and the indication information for not applying the limitation of the sidelink DRX for data transmission to the destination address.

Based on this, the base station does not consider the limitation of the sidelink DRX when scheduling resources for sidelink communication to the first terminal. That is, the sidelink transmission resource does not need to be limited within an activation duration of the sidelink DRX. In this way, when the terminal performs sidelink communication based on the sidelink transmission resources scheduled by base station, it also correspondingly does not apply the limitation of the sidelink DRX.

Optionally, the first terminal can report transmission situations of multiple destination addresses to the base station in the same indication information. That is, the first terminal indicates the base station whether to not apply the limitation of the sidelink DRX for data transmission to the multiple destination addresses. If the transmission situations of the multiple destination addresses are the same, such as all not applying the limitation of the sidelink DRX or applying the limitation of the sidelink DRX, the first terminal can transmit only one indication message to the base station. If the transmission situations of the multiple destination addresses are different, such as some not applying the limitation of the sidelink DRX and some applying the limitation of the sidelink DRX, the first terminal transmits indication information for each destination address to the base station separately.

In an embodiment, if the first terminal is the data transmitting end, the first terminal determining to not apply the limitation of the sidelink DRX may include not applying the limitation of the sidelink DRX when selecting a sidelink resource for transmitting data to the destination address.

In one example, if the first terminal is in an RRC non-connected state, such as an RRC idle state or an RRC inactive state, the sidelink communication of the first terminal is not controlled by the serving cell. Therefore, the first terminal can select the sidelink resource for sidelink communication on its own. When selecting the resource, all sidelink transmitting resources can be used to transmit data to the destination address without being limited by the sidelink DRX.

In an embodiment, if the first terminal is the data receiving end, the first terminal determining to not apply the limitation of the sidelink DRX, includes: receiving data transmitted to the destination address in response to not applying the limitation of the sidelink DRX.

In detail, the first terminal does not need to consider whether it is in a DRX activated state, instead it continuously listens for data transmitted to the destination address at all sidelink receiving resource locations. Therefore, the first terminal can receive data transmitted to the destination address.

Corresponding to the embodiments of the above sidelink communication method, the disclosure also provides embodiments of a sidelink communication apparatus.

Figure 8:
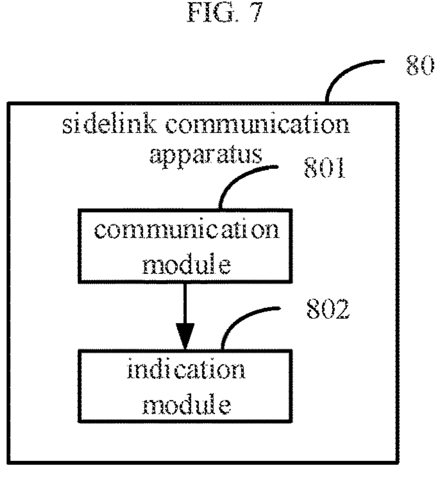
FIG. 8 is a block diagram of a sidelink communication apparatus according to an embodiment of the disclosure.

FIG. 8 is a block diagram of a sidelink communication apparatus according to an embodiment of the disclosure. The sidelink communication apparatus shown in this embodiment can be applied to a first terminal. The first terminal includes but is not limited to communication devices such as mobile phones, tablets, wearable devices, sensors, and Internet of Things (IoT) devices. The first terminal can serve as a user device to communicate with a base station. The base station includes but is not limited to base stations in a communication system such as a 4G base station, a 5G base station, a 6G base station, etc. As shown in FIG. 8, the sidelink communication apparatus may include the following.

A communication module 801 is configured to determine whether to not apply a limitation of sidelink discontinuous reception (DRX) in response to determining that the first terminal performs sidelink communication with a destination address based on a sidelink.

In an embodiment, the communication module 801 is configured to: determine whether a second terminal that is unable to use the sidelink DRX and that performs sidelink communication with the destination address exists; and in response to determining that the second terminal that is unable to use the sidelink DRX and that performs sidelink communication with the destination address exists, determine to not apply the limitation of the sidelink DRX.

In an embodiment, the communication module 801 is configured to determine a communication standard supported by the second terminal; and in response to determining that at least one second terminal does not support a communication protocol of a designated version, determine that the second terminal that is unable to use the sidelink DRX and that performs sidelink communication with the destination address exists. The designated version is a version that supports usage of the sidelink DRX.

In an embodiment, the communication module 801 is configured to: receive system information broadcast by a designated cell; and in response to the system information does not include a parameter for configuring the sidelink DRX, determine that the second terminal that is unable to use the sidelink DRX and that performs sidelink communication with the destination address exists.

In an embodiment, the communication module 801 is specifically configured to receive system information broadcast by a designated cell; and in response to the system information indicating that the designated cell does not support usage of the sidelink DRX, determine that the second terminal that is unable to use the sidelink DRX exists.

In an embodiment, the designated cell is a cell that matches a communication frequency of the sidelink communication.

In an embodiment, the designated cell is at least one of a serving cell and a neighboring cell of the first terminal.

In an embodiment, the communication module 801 is configured to: obtain sidelink DRX configuration: transmit the sidelink DRX configuration to the second terminal that performs the sidelink communication with the destination address; and in response to at least one second terminal rejecting the sidelink DRX configuration, determine that the second terminal that is unable to use the sidelink DRX and that performs sidelink communication with the destination address exists.

In an embodiment, the communication module 801 is configured to: obtain a service characteristic of the sidelink communication; and in response to the service characteristic indicating that a service does not support the sidelink DRX, determine to not apply the limitation of the sidelink DRX.

In an embodiment, the first terminal is a data transmitting end, and the apparatus further includes:

an indication module 802, configured to transmit indication information to a base station in response to determining to not apply the limitation of the sidelink DRX. The indication information indicates the base station to not apply the limitation of the sidelink DRX for data transmission to the destination address.

In an embodiment, the communication module 801 is configured to not apply the limitation of the sidelink DRX in response to selecting a sidelink resource for transmitting data to the destination address.

In an embodiment, the first terminal is a data receiving end, and the communication module 801 is configured to receive data transmitted to the destination address in response to not applying the limitation of the sidelink DRX.

In an embodiment, the destination address is a destination address of a sidelink broadcast or a destination address of groupcast.

Regarding the apparatus in the above embodiments, the specific ways in which each module performs operations have been described in detail in the relevant method embodiments, and will not be elaborated here.

For the apparatus embodiments, since they basically correspond to the method embodiments, relevant content may refer to the description of the method embodiments. The apparatus embodiments described above are only illustrative, where the modules described as separate components may or may not be physically separated, and the components displayed as modules may or may not be physical modules, that is, they can be located in one place or distributed to multiple network modules. Some or all modules can be selected according to actual needs to achieve the purpose of this embodiment. Those skilled in the art can understand and implement it without creative labor.

The embodiments of the disclosure also proposes a sidelink communication device, including:

a processor; and a memory for storing a computer program.

When the computer program is executed by the processor, the above sidelink communication method in any of the above embodiments is performed.

The embodiments of the disclosures further propose a computer-readable storage medium. When the computer program is executed by a processor, the steps of the above sidelink communication method d in any of the above embodiments are performed.

The mechanism of the sidelink communication method according to the disclosure will be summarized and exemplified below based on technical details.

In the related art, a transmitting UE is unable to determine whether sidelink communication of a certain groupcast or a certain broadcast is suitable for use sidelink DRX. Therefore it is unable to determine whether transmission of the corresponding sidelink communication needs to consider an activation duration limitation of the sidelink DRX. Alternatively, a base station transmitting data to the UE is unable to determine whether sidelink communication of a certain groupcast or a certain broadcast uses the sidelink DRX, and whether corresponding sidelink resource scheduling needs to consider the activation duration limitation of sidelink DRX. If the transmitting resources are scheduled according to the activation duration of the sidelink DRX, data latency may be caused. If the transmitting resources are scheduled without considering the activation duration of sidelink DRX, data loss may be led.

To address the aforementioned technical problems, the present disclosure may use the following sidelink communication method.

In an embodiment, a UE determines whether sidelink communication of a destination address is suitable to use sidelink DRX.

In an embodiment, a determination method includes any one or more of the following:

Method 1, determining whether there is an R16 sidelink UE for receiving the sidelink communication of the destination address. If yes, the sidelink communication corresponding to the destination address is not suitable to use the sidelink DRX.

Method 2, determining whether a sidelink DRX parameter is carried in a system broadcast of a cell, the cell may be a serving cell or a neighboring cell. If not carried, the sidelink DRX is not applicable for sidelink communication of broadcast and groupcast.

As an embodiment, the cell is any cell on a sidelink transmission frequency.

As an embodiment, the cell can be a serving cell or a neighboring cell.

Method 3: a system broadcast of a cell carries a function of indicating about support of the sidelink DRX. If the cell does not support the sidelink DRX, the sidelink DRX is not applicable for the sidelink communication of broadcast and groupcast.

As an embodiment, the cell is any cell on a sidelink transmission frequency.

As an embodiment, the cell can be a serving cell or a neighboring cell.

Method 4: If a peer UE receives DRX configuration transmitted by the UE, and returns an indication of rejecting the sidelink DRX, the sidelink DRX is not applicable for the destination address of the peer UE.

In an embodiment, the UE reports information about whether the destination address is suitable to use the sidelink DRX to a base station.

Optionally, if all groupcast or broadcast addresses are not suitable to use the sidelink DRX, only one indication can be reported.

In an embodiment, when the UE transmits sidelink communication to a destination address that is not suitable to use the sidelink DRX, all transmitting resources can be used to for transmission.

In an embodiment, after receiving a destination address that is not the UE the sidelink DRX, the base station does not consider the limitation of the sidelink DRX when scheduling corresponding sidelink transmission resources. That is, the sidelink transmission resources do not need to be limited to the activation duration of the sidelink DRX.

In an embodiment, the UE does not use the sidelink DRX when receiving sidelink communication with a destination address that is not suitable to use the sidelink DRX.

Figure 9:
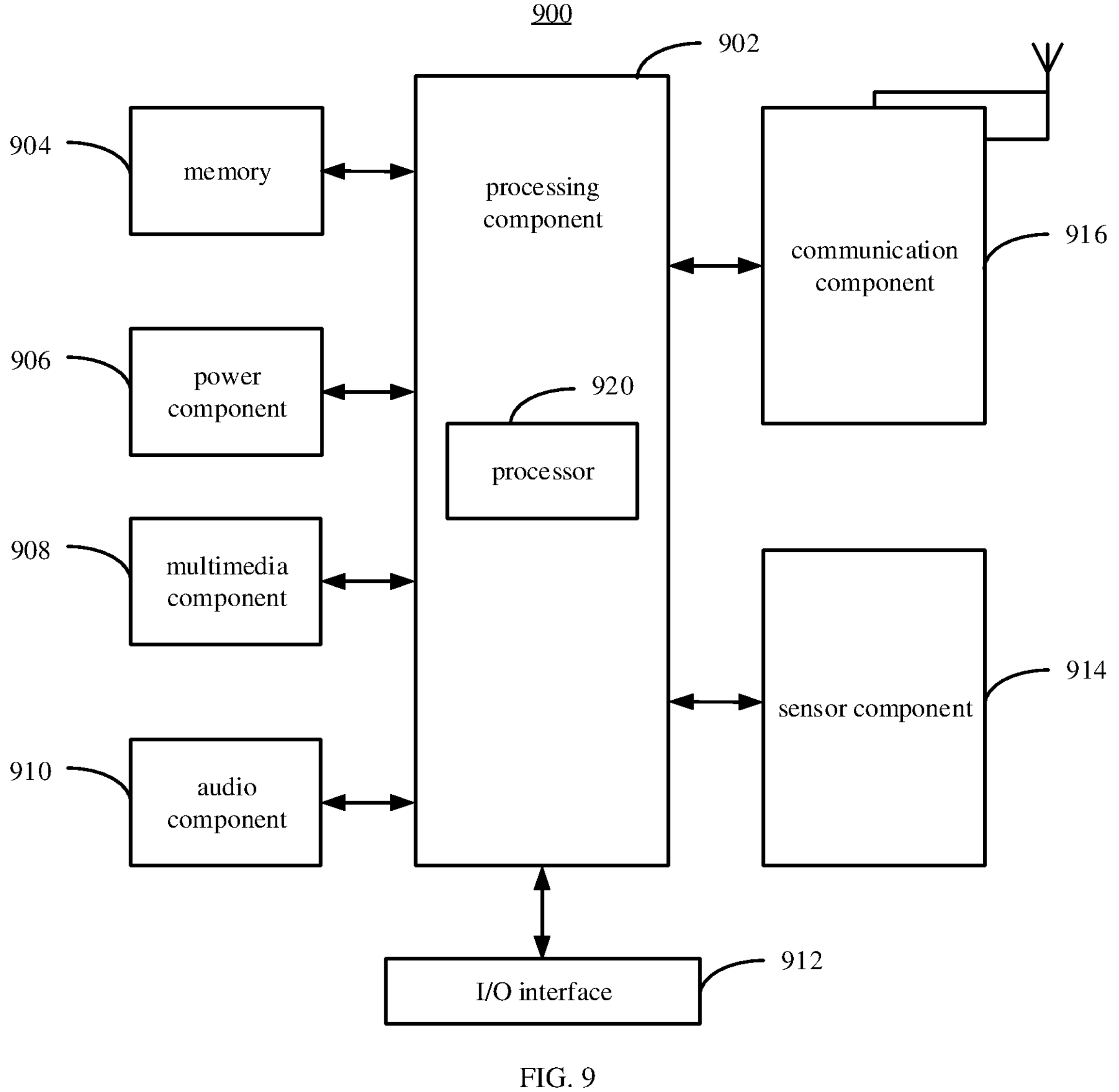
FIG. 9 is a block diagram of a device for sidelink communication apparatus according to an embodiment of the disclosure.

FIG. 9 is a block diagram of a device 900 for sidelink communication according to an embodiment of the disclosure. For example, device 900 can be a mobile phone, a computer, a digital broadcasting terminal, a messaging device, a game console, a tablet device, a medical device, a fitness device, a personal digital assistant, etc.

Referring to FIG. 9, the device 900 may include one or more of the following components: a processing component 902, a memory 904, a power component 906, multimedia component 908, audio component 910, an input/output (I/O) interface 912, a sensor component 914, and a communication component 916.

The processing component 902 typically controls overall operations of the device 900, such as the operations associated with display, telephone calls, data communication, camera operations, and recording operations. The processing component 902 may include one or more processors 920 to execute instructions to implement all or part of the steps in the above described method. Moreover, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, videos, etc. The memory 904 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the device 900 is in an operating mode, such as a shooting mode or a video mode, the front-facing camera and/or the rear-facing camera can receive external multimedia data. Each of the front-facing camera and the rear-facing camera may be a fixed optical lens system or has focal length and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a Complementary Metal Oxide Semiconductor (CMOS) or Charge-Coupled Device (CCD) image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as Wi-Fi, 2G, 3G, 4G LTE, 5G NR, or a combination thereof. In an exemplary embodiment, the communication component 916 receives a broadcast signal from an external broadcast management system or broadcast associated information via a broadcast channel. In an exemplary embodiment, the communication component 916 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 900 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an exemplary embodiment, there is also provided a non-transitory computer readable storage medium including executable instructions, such as the memory 904. The above instructions may be executed by the processor 920 in the device 900, for performing the above methods. For example, the non-transitory computer-readable storage medium may be a ROM, a Random Access Memory (RAM), a CD-ROM, a magnetic tape, a floppy disc, and an optical data storage device.

Other embodiments of the disclosure may be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and embodiments are considered as illustrative only, with a true scope and spirit of the disclosure being indicated by the following claims.

It may be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in this description, relational terms such as first and second are only used to distinguish one entity or operation from another entity or operation, and do not necessarily require or imply any actual relationship or order between these entities or operations. The terms "comprising", "including", or any other variation thereof are intended to encompass non-exclusive containing, such that a process, a method, an item, or a device that includes a series of elements not only includes those elements, but also includes other elements that are not explicitly listed, or also includes elements inherent to such process, method, item, or device. Without further limitations, the elements limited by the statement "including one . . . " do not exclude the existence of other identical elements in the process, method, item, or device that includes the elements.

The above provides a detailed introduction to the methods and devices provided in the embodiments of the disclosures. Specific examples are used in this description to explain the principles and implementations of the present disclosure. The above embodiments are only used to help understand the methods and core ideas disclosed in the disclosure. Meanwhile, for those skilled in the art, there may be changes in specific implementation methods and application scope based on the ideas disclosed in the disclosure. In summary, the content of the specification should not be understood as a limitation on the disclosure.

What is claimed is:

1. A sidelink communication method, performed by a first terminal, comprising:

determining that the first terminal performs sidelink communication with a destination address based on a sidelink, and determining whether to not apply a limitation of sidelink discontinuous reception (DRX);

wherein the first terminal comprises a data transmitting end, and the method further comprises:

in response to determining to not apply the limitation of the sidelink DRX, transmitting indication information to a base station, wherein the indication information indicates the base station to not apply the limitation of the sidelink DRX for data transmission to the destination address.

2. The method according to claim 1, wherein determining whether to not apply the limitation of the sidelink DRX comprises:

determining whether a second terminal that is unable to use the sidelink DRX and that performs sidelink communication with the destination address exists; and when it is determined that the second terminal that is unable to use the sidelink DRX and that performs sidelink communication with the destination address exists, determining to not apply the limitation of the sidelink DRX.

3. The method according to claim 2, wherein determining whether the second terminal that is unable to use the sidelink DRX and that performs sidelink communication with the destination address exists comprises:

determining a communication standard supported by the second terminal; and determining that at least one second terminal does not support a communication protocol of a designated version, and determining that the second terminal that is unable to use the sidelink DRX and that performs sidelink communication with the destination address exists; wherein the designated version is a version that supports usage of the sidelink DRX.

4. The method according to claim 2, wherein determining whether the second terminal that is unable to use the sidelink DRX and that performs sidelink communication with the destination address exists comprises:

receiving system information broadcast by a designated cell; and determining that the system information does not include a parameter for configuring the sidelink DRX, and determining that the second terminal that is unable to use the sidelink DRX and that performs sidelink communication with the destination address exists.

5. The method according to claim 2, wherein determining whether the second terminal that is unable to use the sidelink DRX and that performs sidelink communication with the destination address exists comprises:

receiving system information broadcast by a designated cell; and determining that the system information indicates that the designated cell does not support usage of the sidelink DRX, and determining that the second terminal that is unable to use the sidelink DRX exists.

6. The method according to claim 4, wherein the designated cell is a cell that matches a communication frequency of the sidelink communication.

7. The method according to claim 4, wherein the designated cell is at least one of a serving cell and a neighboring cell of the first terminal.

8. The method according to claim 2, wherein determining whether the second terminal that is unable to use the sidelink DRX and that performs sidelink communication with the destination address exists comprises:

obtaining sidelink DRX configuration;

transmitting the sidelink DRX configuration to the second terminal that performs the sidelink communication with the destination address; and determining that at least one second terminal rejects the sidelink DRX configuration, and determining that the second terminal that is unable to use the sidelink DRX and that performs sidelink communication with the destination address exists.

9. The method according to claim 1, wherein determining whether to not apply the limitation of the sidelink DRX comprises:

obtaining a service characteristic of the sidelink communication; and determining that the service characteristic indicates that a service does not support the sidelink DRX, and determining to not apply the limitation of the sidelink DRX.

10. The method according to claim 1, wherein not applying the limitation of the sidelink DRX comprises:

not applying the limitation of the sidelink DRX while selecting a sidelink resource for transmitting data to the destination address.

11. The method according to claim 1, wherein the first terminal comprises a data receiving end, and not applying the limitation of the sidelink DRX comprises:

receiving data transmitted to the destination address in response to not applying the limitation of the sidelink DRX.

12. The method according to claim 1, wherein the destination address is a destination address of sidelink broadcast or sidelink groupcast.

13. A first terminal, comprising:

a processor; and a memory for storing a computer program executable by the processor;

wherein the processor is configured to:

determine that the first terminal performs sidelink communication with a destination address based on a sidelink, and determine whether to not apply a limitation of sidelink discontinuous reception (DRX);

wherein the first terminal comprises a data transmitting end, and the processor is further configured to:

in response to determining to not apply the limitation of the sidelink DRX, transmit indication information to a base station, wherein the indication information indicates the base station to not apply the limitation of the sidelink DRX for data transmission to the destination address.

14. A non-transitory computer-readable storage medium having stored thereon a computer program that, when executed by a processor of a first terminal, causes the first terminal to perform a sidelink communication method, the method comprising:

determining that the first terminal performs sidelink communication with a destination address based on a sidelink, and determining whether to not apply a limitation of sidelink discontinuous reception (DRX);

wherein the first terminal comprises a data transmitting end, and the method further comprises:

in response to determining to not apply the limitation of the sidelink DRX, transmitting indication information to a base station, wherein the indication information indicates the base station to not apply the limitation of the sidelink DRX for data transmission to the destination address.

15. The first terminal according to claim 13, wherein the processor is further configured to:

determine whether a second terminal that is unable to use the sidelink DRX and that performs sidelink communication with the destination address exists; and when it is determined that the second terminal that is unable to use the sidelink DRX and that performs sidelink communication with the destination address exists, determine to not apply the limitation of the sidelink DRX.

16. The first terminal according to claim 15, wherein the processor is further configured to:

determine a communication standard supported by the second terminal; and determine that at least one second terminal does not support a communication protocol of a designated version, and determine that the second terminal that is unable to use the sidelink DRX and that performs sidelink communication with the destination address exists; wherein the designated version is a version that supports usage of the sidelink DRX.

17. The first terminal according to claim 15, wherein the processor is further configured to:

receive system information broadcast by a designated cell; and determine that the system information does not includes a parameter for configuring the sidelink DRX, and determine that the second terminal that is unable to use the sidelink DRX and that performs sidelink communication with the destination address exists.

18. The first terminal according to claim 15, wherein the processor is further configured to:

receive system information broadcast by a designated cell; and determine that the system information indicates that the designated cell does not support usage of the sidelink DRX, and determine that the second terminal that is unable to use the sidelink DRX exists.

19. The first terminal according to claim 17, wherein the designated cell is a cell that matches a communication frequency of the sidelink communication.

20. The first terminal according to claim 13, wherein the destination address is a destination address of sidelink broadcast or sidelink groupcast.

* * * * *